(No Model.)
J. R. HUNZINGER.
VEHICLE SPRING.
No. 275,769. Patented Apr. 10, 1883.
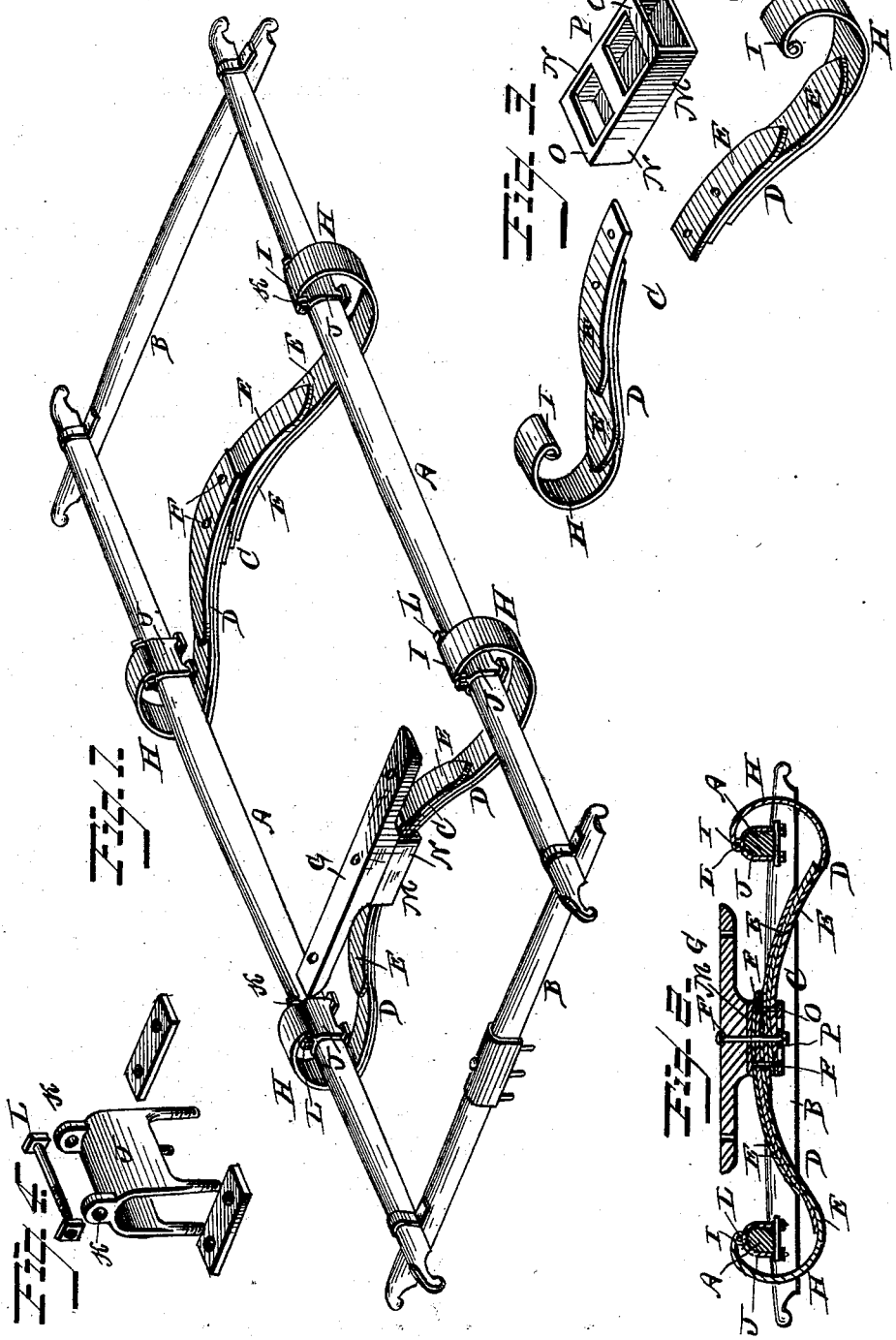

UNITED STATES PATENT OFFICE.

JACOB R. HUNZINGER, OF OLATHE, KANSAS.

VEHICLE-SPRING.

SPECIFICATION forming part of Letters Patent No. 275,769, dated April 10, 1883.

Application filed December 28, 1882. (No model.)

*To all whom it may concern:*

Be it known that I, JACOB R. HUNZINGER, a citizen of the United States, residing at Olathe, in the county of Johnson and State of Kansas, have invented a new and useful Vehicle-Spring, of which the following is a specification, reference being had to the accompanying drawings.

This invention relates to springs for side-bar vehicles; and it consists in certain improvements in the construction of the same, which will be hereinafter fully described, and particularly pointed out in the claim.

In the drawings hereto annexed, Figure 1 is a perspective view of my improved side-bar springs. Fig. 2 is a vertical transverse sectional view taken through one of the springs. Fig. 3 is a detail view of one of the springs detached; and Fig. 4 is a detail view of the clip or coupling which connects the springs with the side bars.

The same letters refer to the same parts in all the figures.

In the drawings, A A represent the side bars, the front and rear ends of which are connected by the end bars, B B, which latter are to be supported in any suitable manner upon springs mounted upon the front and rear axles. The axles and supporting-springs, however, are not shown in the drawings, and they form no part of the present invention.

C C are the springs, each of which consists of two parts or sections, D D. Said sections are constructed each of two or more leaves, E E, which are connected in any suitable manner, so as to form a complete spring. Each of the sections D D is provided at its inner end with a series of perforations, registering with each other when the springs are placed together, as clearly shown in Fig. 2 of the drawings, to receive the bolts F, by which the springs are connected with the head-blocks or bolsters G, upon which the vehicle-body, which is not shown in the drawings, is in practice to be supported. The outer ends of the springs D D are bent or coiled upwardly, as shown at H, and their extreme ends are coiled so as to form eyes I I.

J J are clips secured upon the upper sides of the side bars, and provided with upwardly-projecting lugs or wings, K K, to receive the bolts L L, upon which the outer ends of the springs D D are hinged, as shown, by the eyes I I.

Upon the under sides of the head-blocks or bolsters G, I prefer to secure plates M M, having downward-projecting flanges N at both sides, to confine the springs D and prevent lateral motion to the same. The flanges N N are connected at the ends and at the center by cross-pieces O P, which serve to brace and hold the springs securely in position.

From the foregoing description, taken in connection with the drawings hereto annexed, the operation and advantages of my invention will be readily understood. It is simple and inexpensive. The springs, being made each in two pieces or sections, may be readily adjusted to vehicles of various widths, and they support the vehicle-body on top of the side bars in such a manner as to equalize the strain and prevent spreading.

I claim as my invention and desire to secure by Letters Patent of the United States—

In side-bar vehicles, the combination, with the side bars, of the springs, constructed each in two parts or sections, the inner ends of which have perforations registering with each other, the head blocks or bolsters, the plates secured upon the under sides of the latter and having downwardly-projecting flanges connected by cross-pieces and the connecting-bolts, all arranged and operating substantially as described.

In testimony that I claim the foregoing as my own I have hereto affixed my signature in presence of two witnesses.

JACOB ROBERT HUNZINGER.

Witnesses:
J. R. BROWN,
J. B. MARSHALL.